US011976417B2

United States Patent
Herchl et al.

(10) Patent No.: US 11,976,417 B2
(45) Date of Patent: May 7, 2024

(54) CELLULOSE RAW MATERIAL AND METHOD FOR RECYCLING A CELLULOSE RAW MATERIAL FROM BLENDED TEXTILE WASTE

(71) Applicant: LENZING AKTIENGESELLSCHAFT, Lenzing (AT)

(72) Inventors: Richard Herchl, Ried im Innkreis (AT); Christoph Klaus-Nietrost, Vocklabruck (AT); Christian Weilach, Vocklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 385 days.

(21) Appl. No.: 17/416,348

(22) PCT Filed: Oct. 24, 2019

(86) PCT No.: PCT/EP2019/079067
§ 371 (c)(1),
(2) Date: Jun. 18, 2021

(87) PCT Pub. No.: WO2020/126171
PCT Pub. Date: Jun. 25, 2020

(65) Prior Publication Data
US 2022/0049381 A1    Feb. 17, 2022

(30) Foreign Application Priority Data

Dec. 21, 2018 (EP) ..................... 18215489

(51) Int. Cl.
*D21C 5/00* (2006.01)
*B29B 17/02* (2006.01)
*D01G 11/04* (2006.01)
*D21C 5/02* (2006.01)
*D21H 11/14* (2006.01)

(52) U.S. Cl.
CPC ............ *D21C 5/00* (2013.01); *B29B 17/02* (2013.01); *D01G 11/04* (2013.01); *D21C 5/022* (2013.01); *D21H 11/14* (2013.01); *D10B 2201/02* (2013.01); *D10B 2331/04* (2013.01)

(58) Field of Classification Search
CPC ............ B29B 17/02; D21C 5/00; D21H 11/14
See application file for complete search history.

(56) References Cited

U.S. PATENT DOCUMENTS

| 3,801,273 | A | * | 4/1974 | Mays | D04H 1/58 |
| | | | | | 8/137.5 |
| 5,236,959 | A | * | 8/1993 | Oakley | C08J 11/24 |
| | | | | | 524/34 |
| 10,316,467 | B2 | | 6/2019 | Weilach et al. | |
| 2012/0168102 | A1 | * | 7/2012 | Yoon | D21C 11/00 |
| | | | | | 162/1 |
| 2016/0237619 | A1 | | 8/2016 | Weilach et al. | |
| 2018/0215893 | A1 | * | 8/2018 | Flynn | C08J 11/04 |
| 2020/0165747 | A1 | * | 5/2020 | Lindgren | C08B 9/00 |
| 2021/0130501 | A1 | | 5/2021 | Silbermann et al. | |
| 2021/0269969 | A1 | | 9/2021 | Brelid et al. | |

FOREIGN PATENT DOCUMENTS

| CN | 102675089 | A | | 9/2012 | |
| CN | 103613784 | A | | 3/2014 | |
| CN | 105780201 | A | | 7/2016 | |
| JP | 4947369 | B2 | | 6/2012 | |
| WO | WO-2012168513 | A1 | * | 12/2012 | ............... D21C 3/00 |
| WO | 2015/077807 | A1 | | 6/2015 | |
| WO | 2018/073177 | A1 | | 4/2018 | |
| WO | 2018/115428 | A1 | | 6/2018 | |
| WO | 2020/013755 | A1 | | 1/2020 | |

OTHER PUBLICATIONS

Chemical Book, PET (downloaded online Sep. 1, 2023), 2023. (Year: 2023).*

* cited by examiner

*Primary Examiner* — Anthony Calandra
(74) *Attorney, Agent, or Firm* — Venable LLP

(57) ABSTRACT

A recycled cellulose raw material and a method for recycling a cellulose raw material from blended textile waste with high reliability and yielding high raw material quality is shown, the method comprising the steps in the given order: providing the blended textile waste containing at least one cellulose component and at least one synthetic polymer component, treating the blended textile waste in a non-oxidizing aqueous treatment medium in order to degrade the at least one synthetic polymer component, whereby the treatment is carried out at a temperature between 100° C. and 200° C., and obtaining the recycled cellulose raw material from the treated blended textile waste.

16 Claims, No Drawings

CELLULOSE RAW MATERIAL AND METHOD FOR RECYCLING A CELLULOSE RAW MATERIAL FROM BLENDED TEXTILE WASTE

The present application is a national-stage entry under 35 U.S.C. § 371 of International Patent Application No. PCT/EP2019/079067, published as WO 2020/126171 A1, filed Oct. 24, 2019, which claims priority to EP 18215489.8, filed Dec. 21, 2018, the entire disclosure of each of which is hereby incorporated by reference.

TECHNICAL FIELD

The present invention relates to a method for recycling a cellulose raw material from blended textile waste containing at least one cellulose component and at least one synthetic polymer component.

BACKGROUND ART

It is an objective of the textile industry to provide methods for recycling textile waste in order to reduce the impact of said waste on the environment.

Means for mechanical recycling of textile waste are commonly known, whereby the waste is comminuted and directly converted into recycled end-products such as cleaning wipes, fillings or insulation materials. Yarn-spinning of mechanically recycled fibers usually results in low-quality yarns which have inferior mechanical properties. Besides that, mechanical recycling methods are usually struggling to remove auxiliary components, such as dyes. Thus, mechanically recycled fibers are usually of inferior quality and cannot meet the high demands for the manufacturing of new textiles.

A possible solution to overcome the above-mentioned disadvantages of mechanical recycling lies in the use of chemical recycling methods. For example, textile waste containing a cellulose component may be pre-treated and subsequently manufactured into regenerated cellulosic molded bodies. Methods for producing regenerated molded bodies, however, are very sensitive to the quality of the raw material and impurities therein.

In WO 2015/077807 A1 a method for the pre-treatment of recycled cotton fibers from textile waste is shown, wherein the recycled cotton fibers are subjected to a metal removing stage and a subsequent oxidative bleaching stage. The pre-treated recycled cotton fibers may then be re-used in the production of regenerated cellulosic molded bodies.

WO 2018/115428 A1 discloses a method of treating cotton based raw material under alkaline conditions in combination with a gaseous oxidizing agent.

WO 2018/073177 A1 describes a method of recycling a cellulose raw material from cellulosic textile waste. It discloses treating the cellulose component under alkaline conditions in the presence of a reducing agent to swell the cellulose component. The treatment under alkaline conditions is followed by either oxygen and/or ozone bleaching.

The predominant fraction of textile waste, however, is blended textile waste, i.e. a mixture of different fiber-types such as cellulosic and synthetic polymer fibers. A very common blended textile waste for example contains cotton and polyester fibers. Even fabrics from pure cotton are usually contaminated by polyester from sewing threads, labels or the like. Thus, it is a challenge for textile waste recycling methods to deal with blended textile waste and extract the cellulose component from such blended textile waste without harsh degradation of the cellulose component.

DISCLOSURE OF INVENTION

Thus, it is an object of the present disclosure to provide a reliable method for recycling a cellulose raw material from blended textile waste which results in an improved cellulose raw material quality and which provides a reliable and effective reduction of synthetic polymer components in the blended textile waste.

The stated object is inventively achieved by a method according to independent claim 1.

By providing a blended textile waste, which contains at least one cellulose component and at least one synthetic polymer component, treating the blended textile waste in a non-oxidizing aqueous treatment medium in order to degrade the at least one synthetic polymer component, and obtaining the cellulose raw material from the treated blended textile waste, a simple and reliable method for removing unwanted contaminations due to synthetic polymers from cellulose-containing textile waste may be provided.

If the treatment is further carried out at a temperature above 100° C., the at least one synthetic polymer component contained in the blended textile waste can be efficiently degraded. If the treatment is further carried out at a temperature below 200° C., sufficiently mild process conditions may be maintained to avoid harsh degradation of the at least one cellulose component.

During the degradation of the one or multiple synthetic polymer components, the molecular weight and molecular chain length of the synthetic polymer molecules is deliberately lowered due to hydrolysis, which takes place in the presence of the aqueous treatment medium at elevated temperatures. Thus, the degraded molecules of the synthetic polymer component are reduced in their molecular chain length and are preferably split up into their monomeric constituents, thereby being easily dissolved in the aqueous solution. Subsequently, this enables an easy separation of the synthetic polymer component from the cellulose component, whereby a recycled cellulose raw material with improved purity and quality can be obtained. The invention may thus serve to provide an improved method for recycling a cellulose raw material from blended textile waste, wherein the synthetic polymer component is significantly reduced and a high-quality recycled cellulose raw material with low contamination can be obtained.

In general, recycled cellulose raw material in the sense of this invention may be referred to as recycling pulp, textile pulp, cotton pulp, rag pulp, dissolving pulp, or the like or combinations thereof. Said cellulose raw material can be in particular suitable as a starting material for the manufacture of regenerated cellulosic fibers, such as Lyocell, Viscose-, Modal- or Cupro-fibers. Alternatively, the recycled cellulose raw material may serve as a starting material for the manufacture of paper, paper-like or nonwoven materials from cellulosic pulp.

In general it is further mentioned, that the blended textile waste in the sense of the present invention may be a mixture of any type of cellulosic fibers, that constitute the at least one cellulosic component, and any type of synthetic polymer fibers, that constitute the at least one synthetic polymer component. Suitable cellulosic fibers include for example cotton-, rayon-, Viscose-, Lyocell- or Modal-fibers. The synthetic polymer component may for example comprise polyamide-, or polyester-fibers or any other synthetic fibers that may be degraded through hydrolyzation. The fibers as stated above may vary in diameter and length and can be continuous fibers (filaments) or staple fibers.

Further, the blended textile waste may be a pre- and/or post-consumer textile waste, a cheap and reliable method for providing a cellulose raw material can be provided. A post-consumer textile waste may comprise one or multiples of the follows: worn garments such as shirts, jeans, skirts, dresses, gowns, suits, overalls, trousers, pants, underwear, sweaters, pullovers, etc.; used home-textiles such as bed linen, towels, curtains, cloths, tablecloths, seat covers, drapery, upholstery fabrics or the like; nonwoven articles such as wipes, diapers, filters or similar. Pre-consumer textile waste may comprise cuttings or scraps from the production of garments, home-textiles, nonwovens, etc., or production waste from the manufacturing of yarns, textiles or regenerated cellulosic fibers.

It is furthermore mentioned, that the aqueous treatment medium in the sense of the present invention is non-oxidizing, i.e. the treatment medium is substantially free from oxidizing agents. It is further stated, that an exposure of the treatment medium to atmospheric oxygen partial pressures is not considered as oxidizing agents being present in the treatment medium and, thus, non-oxidizing. In particular, the treatment in step b) is carried out at an oxygen partial pressure below 1 bar, more particularly below 0.5 bar, even more particularly below 0.25 bar.

The process can be further improved, if the aqueous treatment medium contains at least one hydrolyzing agent, and whereby the amount of said at least one hydrolyzing agent is adjusted to the amount of the at least one synthetic polymer component in the blended textile waste, such that the synthetic polymer component is essentially fully degraded, i.e. said hydrolyzing agent is added in at least such an amount, that essentially all hydrolytically cleavable bonds in the synthetic polymer component are cleaved after the treatment in step b). The hydrolyzing agent thereby acts as a catalyst to improve the cleavage of the hydrolytically cleavable bonds in the synthetic polymer component. Such hydrolytically cleavable bonds may be for example ester-bonds (e.g. in polyesters) or amide-bonds (e.g. in polyamides). By dosing the amount of the hydrolyzing agent with respect to the synthetic polymer content, the degradation of the synthetic polymer component may be balanced with viscosity (degree of polymerization) adjustment, due to a reduced excess of the hydrolyzing agent, which may act to degrade the cellulose component and thus reduce the quality of the recycled cellulose raw material. A process with improved control and detailed viscosity adjustment of the resulting cellulose raw material thus becomes possible by avoiding harsh cellulose degradation reactions while at the same time efficiently degrading the synthetic polymer component.

If the at least one hydrolyzing agent is a base, the controllability of the process can be further improved. The base can act as an efficient catalyst in the alkaline hydrolyzation reaction to cleave the hydrolytically cleavable bonds, whereby the base is consumed in the reaction, e.g. by forming salts with the cleaved synthetic polymer constituents. Thus, after full degradation of the synthetic polymer component, only a small amount of excess free base is present in the alkaline aqueous treatment medium and the degradation of the cellulose component may be strongly reduced. Furthermore, due to the treatment of the cellulose component in the aqueous alkaline treatment medium, the cellulose component can be swollen and, thus, the internal structure of the cellulose component can be opened up, which increases the ability to access, remove and/or disentangle non-cellulosic components (e.g. non-covalent bound dyes, dirt, impurities, non-cellulosic fibers, etc.) from the cellulosic component. The loosened non-cellulosic components can then be removed efficiently and a purified recycled cellulose raw material may be obtained.

Further, if the base used as hydrolyzing agent is sodium hydroxide (NaOH), a reliable and cost-efficient process may be provided. The total content of NaOH in the aqueous alkaline treatment medium may thereby range from 10 to 300 g, such as from 20 to 250 g, per kg of blended textile waste, depending on the amount of synthetic polymer component contained in the blended textile waste. NaOH can serve as a cost-efficient and reliable base, which is readily available and widely used for the treatment of pulp and cellulose raw material.

The cost-efficiency of the process can be improved, if the at least one hydrolyzing agent is an acid. The acid is able to act as an efficient hydrolyzing agent, acting as a catalyst to hydrolyze and cleave the hydrolytically cleavable bonds. As the acid is usually not consumed in the reaction, only low catalytic amounts of hydrolyzing agent may be needed to essentially fully degrade the synthetic polymer component. The process can be further improved, if the acid is sulfuric acid ($H_2SO_4$), which is readily available in processes for treating cellulose-based raw materials.

The reliability of the process may be further improved, if prior to step b) the process comprises the steps: analyzing the blended textile waste and thereby determining the amount of the synthetic polymer component, calculating the amount of the at least one hydrolyzing agent needed to fully degrade the synthetic polymer component and providing the aqueous treatment medium comprising said at least one hydrolyzing agent in the calculated amount for the treatment of the blended textile waste in step b).

The aforementioned process may be further improved in its reliability, if the amount of the hydrolyzing agent is at least 1 mol, more particularly at least 1.25 mol, even more particularly at least 1.5 mol, per mol of hydrolytically cleavable bonds in the synthetic polymer component. Thus, the minimum amount of hydrolyzing agent added in step b) is to satisfy the stoichiometric ratio of the hydrolyzing agent to the hydrolytically cleavable bonds of the synthetic polymer component. The above mentioned condition may equally be fulfilled, if the ratio ($n_{agent}/n_{bonds}$) between the amount of hydrolyzing agent $n_{agent}$ to the amount of hydrolytically cleavable bonds $n_{bonds}$ in the synthetic polymer component is greater than 1, more particularly greater than 1.25, even more particularly greater than 1.5.

Furthermore, if the amount of the hydrolyzing agent is less than 3 mol, more particularly less than 2.75 mol, even more particularly less than 2.5 mol, per mol of hydrolytically cleavable bonds in the synthetic polymer component, the excess of unconsumed hydrolyzing agent can be greatly reduced. Thus, the excess of hydrolyzing agent over the amount needed to fully degrade the synthetic polymer component can be kept at a minimum while providing sufficient hydrolyzing agent to fully degrade the synthetic polymer component. A more cost-efficient process may therefore be obtained. The above mentioned condition may equally be fulfilled, if the ratio ($n_{agent}/n_{bonds}$) between the amount of hydrolyzing agent $n_{agent}$ to the amount of hydrolytically cleavable bonds $n_{bonds}$ in the synthetic polymer component is lower than 3, more particularly lower than 2.75, even more particularly lower than 2.5.

The reliability of the process may be further improved while ensuring a high-quality cellulose raw material, if the treatment in step b) is carried out at a temperature between 110° C. and 190° C. The aforementioned advantages may be even further improved, if the treatment is carried out at a temperature between 120° C. and 180° C., such as between 125° C. and 175° C., such as between 130° C. and 170° C. Thus, a high-quality recycled raw material with low contamination can be obtained with the present method, as a reliable degradation and reduction of the synthetic polymer component can be ensured while unwanted degradation of the cellulose component can be suppressed.

The quality of the cellulose raw material may be further improved, if the treatment in step b) is carried out for a duration of less than 300 min. Avoiding long treatment durations may effectively serve to reduce degradation reactions of the cellulose component. Even further improvement may be achieved, if the treatment is carried out for a duration of between 30 min and 250 min, more particularly for a duration between 60 min and 200 min, even more particularly for a duration between 120 min and 180 min.

A very high effectiveness of the present method may be obtained, if the at least one synthetic polymer component contains a type of polyester- or polyamide-fiber. Such polyester fiber may be for example a PET-(polyethylene terephthalate), PBT-(polybutylene terephthalate), PTT-(polytrimethylene terephthalate), PEN-(polyethylene naphthalate), PLA-(polylactic acid), PGA-(polyglycolide) or PBS-fibers (polybutylene succinate). The polyamide fiber may be a fiber from aliphatic polyamides, such as Nylon PA 6 (polycaprolactam) or Nylon PA 66 (poly[hexamethylene adipamide]), or aromatic polyamides (aramids), such as PPTA (poly[p-phenyleneterephthalamide])) or PMPI (poly[m-phenyleneisophthalamide]).

If the treatment in step b) is carried out under reducing conditions, the swelling of the cellulose component may be further improved and, thus, the cellulose yield can be increased. Additionally, the reducing conditions can help to remove vat dyes, such as indigo, which are non-covalently bound to the cellulose component.

The aforementioned advantages can be further improved, if at least one reducing agent is present during step b). More particularly, the swelling of the cellulose component may be further improved, if the at least one reducing agent comprises sodium dithionite ($Na_2S_2O_4$) or thiourea dioxide, ($CH_4N_2O_2S$). Preferably, the reducing agent is present in a concentration from 1 to 100 g, more particularly between 25 g and 75 g, per kg of blended textile waste.

The quality of the recycled cellulose raw material can be further improved, if after step b), the blended textile waste is subjected to at least one bleaching step at alkaline and/or acidic conditions. Thereby, remaining dyes, which could not be removed in step b), can be bleached and/or degraded. The thereby obtained raw material has a high whiteness and is thus suitable to be used in a variety of application, such as the manufacture of cellulosic products, e.g. Viscose fiber production, Lyocell fiber production, Modal fiber production or paper production. Furthermore, if the bleaching step is an oxidative bleaching step, a reliable removal of a wide variety of dyes can be assured.

If the blended textile waste is washed and optionally pressed prior to being subjected to the bleaching step and/or between the bleaching steps, the efficiency of the bleaching can be further improved. This in particular holds true if the bleaching step following step b) is at acidic conditions while the treatment in step b) is at alkaline condition or vice versa. Also if the treatment in step b) is carried out under reducing conditions, washing the blended textile waste before subjecting it to a bleaching step can greatly improve the efficiency of the beaching step. Thereby it can be ensured, that the condition of the treatment in step b) is already neutralized prior to subjecting said blended textile waste to the bleaching step. This is of equal importance, if a bleaching step under acidic conditions is followed by a bleaching step under alkaline conditions and vice versa.

The reliability of the method can be further improved, if the blended textile waste is comminuted and/or disintegrated prior to the treatment in step b). The comminution and/or disintegration of the blended textile waste may serve to mechanically disentangle the cellulose component from the synthetic polymer component and, thus, allow for a more robust swelling of the cellulose component and degradation of the synthetic polymer component in the aqueous treatment medium.

The reliability of the method can be even further improved, if non-fibrous scrap is at least partially removed from the blended textile waste, prior to the treatment in step b). Non-fibrous scrap can for example result from buttons, zippers, decorative elements, prints, labels and/or dirt. Such non-fibrous scrap is commonly contained in textile waste in the form of solid particles consisting of materials such as metals or synthetic polymers.

A reliable method for recycling may be provided, if the amount of the cellulose component and of the synthetic polymer component in the blended textile waste is at least 1 wt.-%, more particularly at least 2 wt.-%, even more particularly at least 3 wt.-%.

A more reliable method for recycling cellulose from blended textile waste may be provided, if the treatment in step b) comprises submerging the blended textile waste in the aqueous treatment medium to obtain a suspension. The submerging of the blended textile waste can result in a more even and homogeneous treatment of the blended textile waste, in particular if the blended textile waste is stirred during submerging.

If the treatment further comprises heating the suspension to a temperature above 100° C., the aforementioned method may easily ensure a fast and reliable degradation of the synthetic polymer component. More particularly, if the treatment further comprises keeping the temperature of the suspension above at least 100° C. during the degradation of the synthetic polymer component, a high-quality recycled raw material with high purity may be obtained.

It is also an object of the present disclosure to provide a high-quality recycled cellulose raw material with high purity and high whiteness.

The present invention achieves the stated object by a recycled cellulose raw material obtained through a method according to any of claims 1 to 13. Such recycled cellulose raw material is suitable to be used or re-used in the production of regenerated cellulosic molded bodies, which poses high demands regarding quality and purity on the raw material. Spinning dopes prepared from such cellulose raw material have only little impact on filter pollution and yield regenerated molded bodies with excellent brightness.

The recycled cellulose raw material according to claim 14 can be advantageously used for the production of regenerated cellulosic molded bodies, e.g. according to a Viscose-, Modal-, Cupro-, Lyocell- or ionic liquid-process, for the production of molded bodies from cellulose-derivatives, e.g. cellulose acetate, as well as for the production of paper or nonwoven articles.

MODES FOR CARRYING OUT THE INVENTION

In the following, the invention is demonstrated according to a number of embodiments.

In a first embodiment, the method for recycling a cellulose raw material from blended textile waste comprises the following steps in the given order:
 a) providing the blended textile waste containing at least a cellulose component and a synthetic polymer component,
 b) treating the blended textile waste in a non-oxidizing aqueous treatment medium in order to degrade the synthetic polymer component, whereby the treatment is carried out at a temperature between 100° C. and 200° C., and
 c) obtaining the recycled cellulose raw material from the treated blended textile waste.

In step a), a blended textile waste is provided, which consists of a mixture of different textile fibers, which form at least one cellulose component and at least one synthetic polymer component. Besides the cellulose and synthetic polymer component, the blended textile waste may also comprise residues of other textile fibers, such as natural protein-based fibers. The blended textile waste is a pre- and/or post-consumer textile waste as described above. The cellulose component from said textile waste comprises cellulose-based fibers, e.g. cotton-, Viscose-, Modal-, Lyocell- or Cupro-fibers. The cellulose component can then be recovered from the textile waste and recycled to a cellulose raw material which can serve to produce new regenerated cellulosic fibers. The synthetic polymer component from said textile waste on the other hand comprises non-cellulosic synthetic polymer textile fibers, such as, but not limited to, polyester- or polyamide-fibers, which can be degraded by means of hydrolyzation.

The fibers of the cellulose- and synthetic polymer component are usually intrinsically intermingled in the textile waste, e.g. due to yarn-spinning, knitting and/or weaving. Thus, prior to the treatment in step b), the blended textile waste is comminuted and/or disintegrated in order to separate the fibers of the different components so as they may be treated individually and more efficiently. Additionally, non-fibrous scrap is at least partially removed from the blended textile waste, prior to the treatment in step b). Such non-fibrous scrap may result from non-fibrous solid components contained in textiles, such as buttons, zippers, decorative elements, prints, labels and/or dirt.

In another embodiment, as a pre-treatment, the blended textile waste is washed and pressed dry to remove any loose dirt prior to subjecting it to the treatment in step b).

In step b), the blended textile waste is treated in an aqueous treatment medium in order to degrade the synthetic polymer component. Thereby the blended textile waste is submerged in the aqueous treatment medium to form a suspension. Optionally, the suspension may be stirred or forcefully intermixed to improve the dispersion of the blended textile waste. The suspension is then heated to a temperature above at least 100° C., whereby the treatment of the blended textile waste is further carried out at a temperature between 100° C. and 200° C. In further embodiments, the treatment of the blended textile waste in step b) is carried out at a temperature between 110° C. and 190° C., between 120° C. and 180° C., between 125° C. and 175° C., or between 130° C. and 170° C.

In the first embodiment, the treatment medium contains a hydrolyzing agent, which is added to the aqueous treatment medium in an amount which is adjusted to the content of the synthetic polymer component in the blended textile waste. This can be done by analyzing the blended textile waste prior to the treatment in step b), thereby determining the content of the synthetic polymer component in the blended textile waste. On the basis of the determined synthetic polymer component content, the amount of hydrolyzing agent is selected such that the synthetic polymer component is essentially fully degraded during the treatment in step b).

The hydrolyzing agent in the present embodiment is a base, in particular NaOH. Thus, the non-oxidizing aqueous treatment medium is an aqueous alkaline treatment medium, and the synthetic polymer component is degraded by means of alkaline hydrolyzation. The amount of base added to the aqueous alkaline treatment medium is selected to be between 1 mol and 3 mol per mol of hydrolytically cleavable bonds in the synthetic polymer component. From the content and composition of the synthetic polymer component, the amount of hydrolytically cleavable bonds may easily be derived. If, for example, the synthetic polymer component is polyethyleneterephtalate (PET), the monomer unit has a molar weight $M_{PET}$ of 192.17 g/mol and comprises 2 ester bonds. Thus, the amount $n_{bonds,PET}$ of hydrolytically cleavable bonds of the PET-component amounts to $$n_{bonds,PET} = 2 \cdot M_{PET}/M_{PET}, \quad (1)$$

where $M_{PET}$ is the total mass of PET contained in the blended textile waste. This scheme may be applied mutatis mutandis to all other synthetic polymer components contained in the textile waste and subsequently added together:

$$n_{bonds} = n_{bonds,PET} + n_{bonds,pc2} + n_{bonds,pc3} + \ldots, \quad (2)$$

where $n_{bonds,pc2}$ and $n_{bonds,pc3}$ are the amounts of hydrolytically cleavable bond of an optional second and third synthetic polymer component, determined equivalently through formula (1). Thus, as mentioned above, the amount of base (NaOH) as hydrolyzing agent $n_{agent}$ added to the aqueous treatment medium is between $1 \cdot n_{bonds}$ and $3 \cdot n_{bonds}$, where $n_{bonds}$ refers to the total amount of hydrolytically cleavable bonds in all synthetic polymer components. Therefore, the following ratio between amount of agent and amount of bonds is satisfied:

$$1 \leq n_{agent}/n_{bonds} \leq 3. \quad (3)$$

In a further embodiments, the amount of base added to the aqueous alkaline treatment medium is selected to be at least 1.25 mol or at least 1.5 mol and at maximum 2.75 mol or 2.5 mol per mol of hydrolytically cleavable bonds in the synthetic polymer component. Thus, the amount of base added would satisfy $1.25 \leq n_{agent}/n_{bonds} \leq 2.75$, or $1.5 \leq n_{agent}/n_{bonds} \leq 2.5$.

The aqueous alkaline treatment medium serves to swell the cellulose component in order to open the structure of the cellulosic fibers and thereby remove unwanted substances contained therein, such as colors, dyes, resins or other textile finishing chemicals. Further, the synthetic polymer component gets degraded, i.e. hydralized, in the aqueous alkaline treatment medium. During said degradation, the synthetic polymer component is destroyed while the cellulose component is essentially left unaltered. PET-fibers of the first synthetic polymer component, as described above, are split up in to their constituents ethylene glycol and terephtalic acid by cleaving the ester bonds in the PET-chain molecules. The NaOH molecules are thereby consumed by the reaction and the subsequent formation of terephthalic acid disodium salt (disodium terephtalate $C_8H_4Na_2O_4$), leaving only a small amount of NaOH molecules in excess.

In step c), a recycled cellulose raw material is finally obtained from the treated blended textile waste. In the present embodiment, the cellulose raw material is obtained by separating the swelled cellulose component from all the non-cellulosic constituents, such as the degraded synthetic polymer component. Such separation can be easily performed, e.g. by filtration of the suspension.

In a second embodiment, steps a) to c) are performed as described above for the first embodiment. Additionally, the treatment in step b) is carried out under reducing conditions. Thereby, at least one reducing agent is present in the aqueous alkaline medium and thus in the suspension. The reducing agent is preferably chosen from sodium dithionite ($Na_2S_2O_4$) or thiourea dioxide ($CH_4N_2O_2S$) and is present in the alkaline medium in a concentration from 1 to 100 g, such as between 25 and 75 g, per kg of blended textile waste.

In a third embodiment, additionally to the steps in the first or second embodiment above, the blended textile waste is subjected to at least one bleaching step after the treatment in step b). The bleaching steps can either be at alkaline and/or acidic conditions. Preferably the treatment in step b) is followed by at least one oxidative bleaching step. Therefore, it is preferable that the blended textile waste is washed and optionally pressed prior to being subjected to the bleaching step to neutralize the conditions of the preceding treatment and improve the efficiency of the following bleaching step.

EXAMPLES

In the following examples, embodiments of the invention are illustrated in further detail, without limiting the scope of the invention in any matter.

In all demonstrated examples, a method for producing a recycled cellulose raw material according to the present invention was applied to the blended textile waste, where several parameters of the treatment are varied throughout the examples. In all examples, the composition of the textile waste was first determined by means of NIR-spectroscopy (near-infrared spectroscopy). After the treatment, the obtained recycled cellulose raw material was separated from the spent aqueous treatment solution through a Buchner funnel and again analyzed by means of NIR-spectroscopy to determine its composition (e.g. content of residual synthetic polymer component). Similarly, the spent aqueous treatment solution was analyzed to determine the content of excess treatment agents (e.g. hydrolyzing agent/base). From the determined compositions of the recycled cellulose raw material, the synthetic polymer component reduction and the cellulose component yield were determined.

Examples A to C

Examples A, B and C show the results of a method for producing a recycled cellulose raw material, where a blended textile waste from bed linens with a composition of 61.1% cellulose component and 37.9% synthetic polymer component was used. The cellulose component was composed of cotton fibers and the synthetic polymer component was composed of PET fibers. Content of other components included in the textile waste was below 0.1%. In all four examples, the blended textile waste was comminuted and subsequently treated in an alkaline aqueous treatment medium, where NaOH was used as a hydrolyzing agent. The temperature during the treatment of step b) was held at 150° C. for different durations. Additionally, NaOH concentrations were varied between 70 g/kg and 110 g/kg of blended textile waste. All NaOH concentrations were chosen, such that after the treatment of the blended textile waste in the aqueous alkaline treatment medium, no residual NaOH was present in the spent aqueous treatment medium.

The results of the Examples A to C are summarized in Table 1.

Examples D to G

In examples D, E, F and G, a method for producing a recycled cellulose raw material was employed equivalently as for examples A to C. In examples D and F, a mixed blended textile waste with a composition of 84% cellulose component and 16% synthetic polymer component was used. The cellulose component was composed of cotton fibers and the synthetic polymer component was composed of PET fibers. In examples E and G a blended textile waste from white shirts was used, which comprised 88.2% cellulose component and 11.8% synthetic polymer component. Contents of other residual components in all examples were determined to be below 0.1%. In all four examples, the blended textile waste was comminuted and subsequently treated in an alkaline aqueous treatment medium, where NaOH was used as a hydrolyzing agent. In examples D, E and G, the temperature during the treatment of step b) was held at 150° C. for different durations between 60 min and 180 min. In example F, the temperature was held at 130° C. for a duration of 150 min. The NaOH concentrations in all examples E to G were varied between 100 g/kg and 200 g/kg of blended textile waste, such that the ratio between amount of base and amount of hydrolytically cleavable bonds ($n_{agent}/n_{bonds}$) was between approximately 1.5 and 4. Thus, residual NaOH was present in the spent aqueous treatment medium after obtaining the recycled cellulose raw material.

The results of the Examples E to G are summarized in Table 1.

Example H

In example H, a method for producing a recycled cellulose raw material was employed equivalently as for the above mentioned examples A to G, whereby a blended textile waste from shirts with a composition of 81.4% cellulose component and 18.6% synthetic polymer component was used. The cellulose component was composed of cotton fibers and the synthetic polymer component was composed of PET fibers. The content of other residual components was below 0.1%. The blended textile waste was comminuted and subsequently treated in an alkaline aqueous treatment medium, where NaOH was used as a hydrolyzing agent. Additionally, in example H, the treatment in step b) was carried out under reducing conditions, whereby sodium dithionite (Na2S2O4) was used as a reducing agent in the aqueous treatment medium in a concentration of 50 g/kg of blended textile waste. The temperature during the treatment was held at 130° C. for a duration of 120 min. The NaOH was selected to 150 g/kg of blended textile waste.

The results of example H are shown in Table 2.

Comparative Examples U, V and W

For comparison, in examples U, V and W, a method for producing a recycled cellulose raw material was employed in a similar manner as described above, however, where the temperature during the treatment was held below 100° C. In the examples U to W, blended textile wastes from mixed sources with different compositions were used: in example U, the blended textile waste comprised 76.5% cellulose component and 23.5% synthetic polymer component; in example V, the blended textile waste comprised 84.0% cellulose component and 16.0% polymer component; and in example W, the blended textile waste comprised 89.8% cellulose component and 10.2% synthetic polymer component. Content of other residual components in all examples U to W were below 0.1%. In all three comparative examples, the blended textile waste was comminuted and subsequently treated in an alkaline aqueous treatment medium, where NaOH was used as a hydrolyzing agent, with a temperature during the treatment of step b) of 90° C. for a duration of 120 min. In examples V and W, additionally, the treatment in step b) was carried out under reducing conditions, whereby sodium dithionite ($Na_2S_2O_4$) was used as a reducing agent in the aqueous treatment medium in a concentration of 50 g/kg of blended textile waste.

The results of comparative examples U, V and W are summarized in Table 2.

| Examples A to G | | | | | | | |
|---|---|---|---|---|---|---|---|
| | A | B | C | D | E | F | G |
| Blended textile waste: | | | | | | | |
| Cotton content [wt.-%] | 62.1 | 62.1 | 62.1 | 84.0 | 88.2 | 84.0 | 88.2 |
| PET content [wt.-%] | 37.9 | 37.9 | 37.9 | 16.0 | 11.8 | 16.0 | 11.8 |
| other [wt.-%] | <0.1 | <0.1 | <0.1 | <0.1 | <0.1 | <0.1 | <0.1 |
| Treatment conditions: | | | | | | | |
| temperature [° C.] | 150 | 150 | 150 | 150 | 150 | 130 | 150 |
| duration [min] | 150 | 90 | 210 | 150 | 180 | 150 | 60 |
| NaOH conc. [g/kg] | 70 | 110 | 110 | 100 | 100 | 200 | 200 |
| $n_{agent}/n_{bonds}$ | 0.44 | 0.70 | 0.70 | 1.50 | 2.03 | 3.00 | 4.07 |
| Cellulose raw material | | | | | | | |
| PET content [wt.-%] | 27.6 | 27.6 | 33.1 | <0.4 | <0.7 | <0.5 | <0.7 |
| PET reduction [%] | 12.7 | 27.2 | 36.7 | >97.5 | >94.0 | >97.0 | >94.0 |
| Cellulose yield [%] | 78.3 | 96.0 | 96.7 | 90.2 | 86.9 | 90.5 | 89.4 |
| Intrinsic viscosity [ml/g] | 637 | 659 | 622 | 821 | 776 | 911 | 826 |
| Excess NaOH [g/l] | — | — | — | 0.4 | 1.0 | 8.8 | 10.8 |

TABLE 2

| Example H and comparative examples U to W | | | | |
|---|---|---|---|---|
| | H | U (comp.) | V (comp.) | W (comp.) |
| Textile waste: | | | | |
| Cotton content [wt.-%] | 81.4 | 76.5 | 84.0 | 89.8 |
| PET content [wt.-%] | 18.6 | 23.5 | 16.0 | 10.2 |
| Other [wt.-%] | <0.1 | <0.1 | <0.1 | <0.1 |
| Alkaline treatment: | | | | |
| Temperature [° C.] | 130 | 90 | 90 | 90 |
| Duration [min] | 120 | 120 | 120 | 120 |
| NaOH conc. [g/kg] | 15.0 | 15.0 | 15.0 | 15.0 |
| $n_{agent}/n_{bonds}$ | 1.94 | 1.53 | 2.25 | 3.53 |
| Reducing agent [g/kg] | 50 | — | 50 | 50 |
| Cellulose raw material | | | | |
| PET content [wt.-%] | 4.3 | 20.2 | 13.1 | 9.5 |
| PET reduction [%] | 81.1 | 22.1 | 28.9 | 16.4 |
| Cellulose yield [%] | 96.2 | 94.6 | 89.9 | 90.4 |

The invention claimed is:

1. A method for recycling a cellulose raw material from blended textile waste, the method comprising the steps in the given order:
    a) providing the blended textile waste containing at least one cellulose component and at least one synthetic polymer component,
    b) treating the blended textile waste in a non-oxidizing aqueous treatment medium in order to degrade the at least one synthetic polymer component, whereby the treatment is carried out at a temperature between 100° C. and 200° C., and
    c) obtaining the recycled cellulose raw material from the treated blended textile waste:,
    wherein at least one reducing agent is present during step b) and wherein the at least one reducing agent comprises thiourea dioxide ($CH_4N_2O_2S$).

2. The method according to claim 1, wherein aqueous treatment medium contains at least one hydrolyzing agent, and whereby the amount of said at least one hydrolyzing agent is adjusted to the amount of the at least one synthetic polymer component in the blended textile waste, such that the at least one synthetic polymer component is essentially fully degraded.

3. The method according to claim 2, wherein the at least one hydrolyzing agent is a base.

4. The method according to claim 2, wherein the amount of the at least one hydrolyzing agent in the aqueous treatment medium is at least 1 mol per mol of hydrolytically cleavable bonds in the at least one synthetic polymer component.

5. The method according to claim 4, wherein the amount of the at least one hydrolyzing agent in the aqueous treatment medium is less than 3 mol per mol of hydrolytically cleavable bonds in the at least one synthetic polymer component.

6. The method according to claim 1, wherein the treatment in step b) is carried out at a temperature between 110° C. and 190° C.

7. The method according to claim 1, wherein the at least one synthetic polymer component contains a type of polyester- or polyamide-fiber.

8. The method according to claim 1, wherein after step b), the blended textile waste is subjected to at least one bleaching step at alkaline and/or acidic conditions.

9. The method according to claim 8, wherein the blended textile waste is washed and optionally pressed prior to being subjected to the bleaching step and/or between the bleaching steps.

10. The method according to claim 1, wherein the blended textile waste is comminuted and/or disintegrated prior to the treatment in step b).

11. The method according to claim 1, wherein non-fibrous scrap is at least partially removed from the blended textile waste, prior to the treatment in step b).

12. The method according to claim 3, wherein the at least one hydrolyzing agent is NaOH.

13. The method according to claim 1, wherein the treatment in step b) is carried out at a temperature between 120° C. and 180° C.

14. The method according to claim 8, wherein the at least one bleaching step is an oxidative bleaching step.

15. The method according to claim 1, wherein the treatment in step b) is carried out at an oxygen partial pressure below 1 bar.

16. The method according to claim 1, wherein prior to step b) the process comprises the steps:
- analyzing the blended textile waste and thereby determining the amount of the synthetic polymer component,
- calculating the amount of the at least one hydrolyzing agent needed to fully degrade the synthetic polymer component, and
- providing the aqueous treatment medium comprising said at least one hydrolyzing agent in the calculated amount for the treatment of the blended textile waste in step b).

* * * * *